United States Patent [19]

Susa et al.

[11] Patent Number: 4,876,144
[45] Date of Patent: Oct. 24, 1989

[54] SINGLE CRYSTAL THIN FILM

[75] Inventors: Kenzo Susa; Kazumasa Takagi; Toshio Kobayashi, all of Nishitama; Takanobu Takayama, Hachioji; Norio Ohta, Iruma, all of Japan

[73] Assignee: Hitachi, Ltd., Tokyo, Japan

[21] Appl. No.: 111,283

[22] Filed: Oct. 22, 1987

[30] Foreign Application Priority Data

Oct. 22, 1986 [JP] Japan ................ 61-249625

[51] Int. Cl.$^4$ ............... G11B 7/24; B32B 9/00
[52] U.S. Cl. ..................... 428/336; 350/375; 428/457; 428/469; 428/694; 428/700; 428/900; 428/928
[58] Field of Search ............ 428/694, 700, 900, 928, 428/336, 457, 469; 365/122; 369/13, 288; 360/131, 135; 350/375, 376

[56] References Cited

U.S. PATENT DOCUMENTS 4,126,731 11/1978 Nishizawa et al. ................ 428/700
4,650,290 3/1987 van Engen et al. ................ 350/375

FOREIGN PATENT DOCUMENTS 2558937 7/1976 Fed. Rep. of Germany .
0011659 1/1988 Japan .

OTHER PUBLICATIONS de Goot et al, J. Appl. Phys. 55(6), Mar. 15, 1989, p. 2151.
Gomi et al, J. Appl. Phys. 55(6), Mar. 15, 1984, p. 2170.
Chen et al., J. Appl. Phys. 39(8), Jul. 1968, p. 3916.
Gyorgy et al., J. Appl. Phys. 42 (4), Mar. 1971, p. 1704.

Primary Examiner—George F. Lesmes
Assistant Examiner—James B. Monroe
Attorney, Agent, or Firm—Antonelli, Terry & Wands

[57] ABSTRACT

It is disclosed that a Heusler alloy thin film having a structure of a single crystal is prepared by forming a Heusler alloy thin film having a magneto-optical effect and an MgAgAs type crystalline structure on a single crystal substrate, whereby magnetization is easily effected in a low applied magnetic field. This single crystal thin film is suitable as a material of a head for writing magnetically and reading out optically.

12 Claims, 1 Drawing Sheet

SINGLE CRYSTAL THIN FILM

BACKGROUND OF THE INVENTION

1. Field of the Invention

The present invention relates to a Heusler alloy having a magneto-optical effect and particularly to a material suitable for writing magnetically and reading out optically, and to a process for preparing the same.

2. Description of the Prior Art

A Heusler alloy having a magneto-optical effect is described in Applied Physics Letters, 42 (2) (1983), pp. 202 to 204. According to this article, in the case of, for example, PtMnSb, raw materials are heated in a Mo crucible at 850° C. under a reduced Ar pressure for a long time (two weeks) to obtain a polycrystal sample. The flat portion of the sample is subjected to mirror polishing. A high magnetic field of 1.2 T is vertically applied to the polished surface to obtain a high Kerr rotation of 0.93° at a wavelength of 633 nm.

On the other hand, attempts to form a thin film have been made in consideration to application thereof as a device. As described in Nippon Oyo Jiki Gakkaishi, Vol. 9, No. 2 (1985), P. 145, a polycrystalline thin film of an alloy having a composition of $Pt_x(MnSb)_{1-x}$ (where x=0 to 0.2) is prepared by an r.f. sputter method, and heat-treated at 500° C. under a vacuum of $1\times10^{-5}$ Torr for 10 hours. A Kerr rotation of 0.9° is obtained at a wavelength of 633 nm in a perpendicular magnetic field of 4.0 kOe. The coercivity Hc in the in-plane direction is 110 Oe.

The magnetic thin film obtained by the above-mentioned conventional technique is relatively easier to magnetize in the in-plane direction than in the vertical direction. It is desired from the viewpoint of application thereof as a device that it is further easier to magnetize. Particularly, the Hc is preferably as low as possible when consideration is given to application of a magnetic thin film as a device such as a head for writing magnetically and reading out optically.

SUMMARY OF THE INVENTION

An object of the present invention is to provide a Heusler alloy thin film which is easily magnetized in a low applied magnetic field.

The above-mentioned object can be attained by a single crystal thin film of a Heusler alloy having a magneto-optical effect. The use of a single crystal thin film provides a sharp hysteresis loop of magnetization so that it can be easily magnetized in a low applied magnetic field. Thus, the use of the single crystal thin film is quite advantageous from the viewpoint of application thereof as a device. In particular, the crystalline structure of the Heusler alloys may be of the MgAgAs crystalline structure type.

The single crystal thin film of a Heusler alloy can be prepared by using a single crystal substrate as the substrate material. The single crystal substrate preferably has, as the crystalline structure, a diamond, zinc blends, $CaF_2$, C-rare earth, corundum, or spinel structure.

The material of a Heusler alloy is preferably an alloy represented by the general formula: XYZ wherein X is one or more kinds of elements selected from among Pt, Pd, Ni, Co, and Cu; Y is Mn; and Z is one or more kinds of elements selected from among Sb, Sn, and Bi. More specifically, the formula of a Heusler alloy is $X_aY_{1-b}Z_{1+b}$ ($0.75 \leq a \leq 1$, and $-0.125 \leq b \leq 0.125$). The phase diagram is shown in FIG. 2.

DETAILED DESCRIPTION OF THE PREFERRED EMBODIMENTS

It is believed that a single crystal thin film has few crystalline defects as compared with a polycrystalline thin film so that magnetic reverse is easy, leading to easy saturation of not only magnetization but also Kerr rotation.

A single crystal thin film of a Heusler alloy can be obtained by using a single crystal substrate on the basis of the principle of heteroepitaxial growth. Particularly, when the crystalline structure of the substrate is similar to that of the single crystal thin film, the heteroepitaxial effect is enhanced.

Examples of the present invention will now be described.

EXAMPLE 1

A single crystal thin film of a Heusler alloy having a composition of PtMnSb was prepared by the following procedure.

Figure 1:
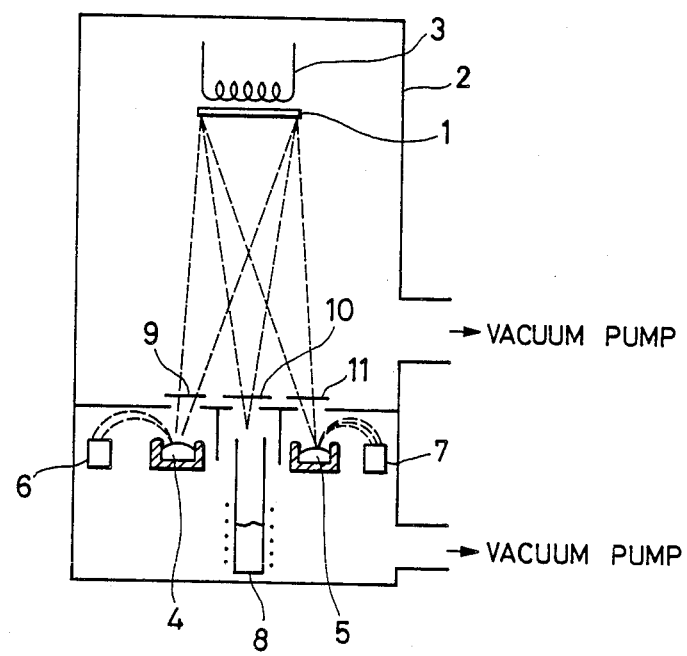
FIG. 1 is a schematic view of an apparatus used in Examples of the present invention and FIG. 2 is a phase diagram of a Heusler alloy.
Figure 2:
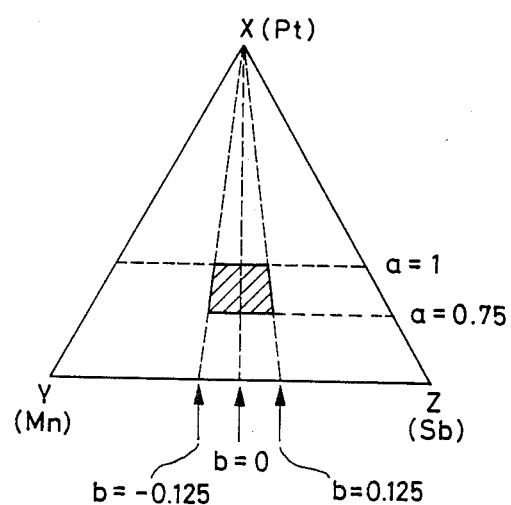

A single crystal substrate consisting of sapphire having a (0001) plane was used as the substrate. The diagram of the principle of the preparation method is shown in FIG. 1. The substrate 1 was set in a high vacuum chamber 2, which was evacuated to a vacuum of $10^{-5}$ Pa or less. The temperature of the substrate was controlled by using a heater 3. Pt 4 and Mn 5 among raw materials were evaporated by means of E/B bombardment 6 and 7, respectively, and Sb was evaporated by a Knudsen cell 8. Thus, evaporation of the raw materials was made independently. Control of the composition of PtMnSb was made by controlling the intensities of beams for Pt, Mn, and Sb as well as by independently operating shutters 9, 10, and 11. The temperature of the substrate was 500° C. and the rate of film formation was 2 Å/s.

The thickness of the formed PtMnSb film was 0.5 µm. As a result of examination according to the reflected high energy electron diffraction method, a diffraction pattern believed to indicate an MgAgAs type crystalline structure was observed. This indicates that a Heusler alloy film with a (111) plane direction epitaxially grew on the sapphire (0001) substrate.

The magnetic measurement of the single crystal thin film was conducted to find that the coercivity Hc was as small as 0.5 Oe in the direction of an easy axis of magnetization in the plane and about 2 Oe in the direction of a hard axis of magnetization, and that the hysteresis loop of magnetization showed soft magnetization properties having a good linearity of magnetization. The Kerr rotation by a slant incident light (angle of incidence: 60°) at 633 nm was as high as 0.85°. As regards the high-frequency characteristics, a permeability µ at 1 MHz was as high as 650.

For comparison, the same procedure as that of the above-mentioned Example was repeated except that a glass substrate (quartz) was used instead of the single crystal substrate. The formed thin film was a polycrystalline film. As a result of magnetic measurement, the in-plane coercivity Hc was 100 Oe. The permeability $\mu$ was as low as 50.

It can be understood from the above-mentioned Example that a Heusler alloy formed into a single crystal is easily magnetized in a low applied magnetic field.

EXAMPLE 2

The same procedure as that of Example 1 was repeated except that the composition of a Heusler alloy composition with such that Pt was substituted with Pd, Ni, Co, or Cu. In every case, a single crystal thin film was obtained. In every case, the applied magnetic field necessary for saturation of magnetization was lower than that of a polycrystalline thin film prepared for comparison and having a corresponding composition. The same effect was obtained where Sn was used instead of Sb in Example 1. The same effect was obtained where part of Pt was substituted with Pd or the like. The same effect was also obtained where part of Sb was substituted with Sn or Bi.

EXAMPLE 3

In the above-mentioned Examples, a (0001) plane of sapphire was used as the substrate. In this Example, Si (111), GaAs (111), CaF$_2$ (111), BaF$_2$ (111), cubic Nd$_2$O$_3$(111), and MgAl$_2$O$_4$ spinel (111) were each used as the substrate to obtain a single crystal thin film of a Heusler alloy PtMnSb epitaxially grown in the (111) plane direction. In every case, the applied magnetic field necessary for saturation of magnetization was by far lower than that in the case of the polycrystalline thin film.

When Si (110), Si (100), BaF$_2$ (110), BaF$_2$ (100), etc. were used as the substrate, Heusler alloys which were epitaxially grown in respective directions were obtained. The effects of single crystals were observed.

EXAMPLE 4

The composition of the PtMnSb thin film prepared in Example 1 was just 1:1:1. The intensity of a beam from a Pt evaporation source was lowered so as to provide a composition of Pt$_{0.75}$Mn$_{1.125}$Sb$_{1.125}$. In this case, it was also confirmed that the obtained film was epitaxially grown. The Kerr rotation of the film was 0.55°, which was lower than that in the case of the 1:1:1 composition but a high value as that of a magneto-optical material. There were cases where the composition ratio of Mn and Sb varied with a change in the amount of Pt. The Kerr rotation of a thin film having a composition of Pt$_{0.75}$Mn$_{0.875}$Sb$_{1.125}$ was 0.41°.

Heusler alloys prepared in the Examples are listed in Table 1.

TABLE 1

| composition | film thickness (μm) | substrate | plane direction of film | Ex. No. |
|---|---|---|---|---|
| Pt Mn Sb | 0.5 | sapphire | (111) | 1 |
| Pd Mn Sb | ↑ | ↑ | ↑ | 2 |
| Ni Mn Sb | ↑ | ↑ | ↑ | 2 |
| Co Mn Sb | ↑ | ↑ | ↑ | 2 |
| Cu Mn Sb | ↑ | ↑ | ↑ | 2 |
| Pt Mn Bi | ↑ | ↑ | ↑ | 2 |
| Pt Mn Sn | ↑ | ↑ | ↑ | 2 |
| (Pt, Pd) Mn Sb | ↑ | ↑ | ↑ | 2 |
| Pt Mn (Sb$_{0.8}$Sn$_{0.2}$) | ↑ | ↑ | ↑ | 2 |
| Pt Mn (Sb$_{0.8}$Bi$_{0.2}$) | ↑ | ↑ | ↑ | 2 |
| Pt Mn Sb | ↑ | Si (111) | ↑ | 3 |
| ↑ | ↑ | GaAs (111) | ↑ | 3 |
| ↑ | ↑ | CaF$_2$ (111) | ↑ | 3 |
| ↑ | ↑ | BaF$_2$ (111) | ↑ | 3 |
| ↑ | ↑ | c-Nd$_2$O$_3$ (111) | ↑ | 3 |
| ↑ | ↑ | MgAl$_2$O$_4$ (111) | ↑ | 3 |
| Pt Mn Sb | 0.5 | Si (110) | (110) | 3 |
| ↑ | ↑ | Si (100) | (100) | 3 |
| ↑ | ↑ | BaF$_2$ (110) | (110) | 3 |
| ↑ | ↑ | BaF$_2$ (100) | (100) | 3 |
| Pt$_{0.75}$Mn$_{0.875}$Sb$_{1.125}$ | ↑ | sapphire (0001) | (111) | 4 |
| Pt$_{0.75}$Mn$_{1.125}$Sb$_{1.125}$ | ↑ | ↑ | ↑ | 4 |

What is claimed is:

1. A single crystal thin film of a Heusler alloy having a magneto-optical effect and a crystalline structure of an MgAgAs type, wherein said thin film is a single crystal formed in at least one layer on a single substrate.

2. A single crystal thin film as claimed in claim 1, wherein said Heusler alloy is an alloy represented by the general formula: XYZ wherein X is one or more kinds of elements selected from the group consisting of Pt, Pd, Ni, Co, and Cu; Y is Mn; and Z is one or more kinds of elements selected from the group consisting of Sb, Sn, and Bi.

3. A single crystal thin film as claimed in claim 2, wherein said alloy is Pt$_{0.75}$Mn$_{1.125}$Sb$_{1.25}$ or Pt$_{0.75}$Mn$_{0.875}$Sb$_{1.125}$.

4. A single crystal thin film as claimed in claim 2, wherein said alloy is PtMnSb, PdMnSb, NiMnSb, CoMnSb, CuMnSb, PtMnBi, PtMnSn, (Pt,Pd) MnSb, PtMn (Sb$_{0.8}$Sn$_{0.2}$), or PtMn (Sb$_{0.8}$Bi$_{0.2}$).

5. A single crystal thin film is claimed in claim 1, wherein said single crystal substrate is sapphire having a (0001) plane.

6. A single crystal thin film as claimed in claim 1, wherein said single crystal substrate is Si (111), GaAs (111), CaF$_2$ (111), BaF$_2$ (111), cubic Nd$_2$O$_3$ (111) or MgAl$_2$O$_4$ spinel (111) and said thin film has a (111) plane direction.

7. A single crystal thin film as claimed in claim 1, wherein said single crystal substrate is Si (110) or BaF$_2$ (110) and said thin film has a (110) plane direction.

8. A single crystal thin film as claimed in claim 1, wherein said single crystal substrate is Si (100) or BaF$_2$ (100) and said thin film has a (100) plane direction.

9. A single crystal thin film as claimed in claim 1, wherein the crystalline structure of said single crystal substrate is a diamond, zinc blende, CaF$_2$, C-rare earth, corundum, or spinel structure.

10. A single crystal thin film as claimed in claim 1, wherein said thin film has a thickness of 0.5 μm.

11. A single crystal thin film as claimed in claim 1, wherein the coercivity Hc in-plane direction is about 0.5 Oe in the direction of an easy axis of magnetization.

12. A single crystal thin film as claimed in claim 11, wherein the coercivity Hc in-plane direction is about 2 Oe in the direction of a hard axis of magnetization.

* * * * *